United States Patent
Bozoukov

(10) Patent No.: US 6,603,986 B1
(45) Date of Patent: Aug. 5, 2003

(54) METHOD AND SYSTEM FOR CONTROLLING CELLULAR TELEPHONE ACCESSORY FUNCTIONS

(75) Inventor: Theodore S. Bozoukov, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/494,832

(22) Filed: Jan. 31, 2000

Related U.S. Application Data

(60) Provisional application No. 60/118,186, filed on Feb. 1, 1999.

(51) Int. Cl.$^7$ ................................................. H04B 1/38
(52) U.S. Cl. ...................................... 455/569; 455/556
(58) Field of Search ................................ 455/569, 567, 455/571, 414, 550

(56) References Cited

U.S. PATENT DOCUMENTS

| | | | | |
|---|---|---|---|---|
| 4,637,022 A | * | 1/1987 | Burke et al. | 371/37 |
| 5,873,045 A | * | 2/1999 | Lee et al. | 455/550 |
| 5,881,103 A | * | 3/1999 | Wong et al. | 375/229 |
| 5,930,729 A | * | 7/1999 | Khamis et al. | 455/571 |
| 6,119,022 A | * | 9/2000 | Osborn et al. | 455/567 |
| 6,128,509 A | * | 10/2000 | Veijola et al. | 455/556 |
| 6,266,542 B1 | * | 7/2001 | Stern et al. | 455/569 |
| 6,317,593 B1 | * | 11/2001 | Vossler | 455/414 |

* cited by examiner

*Primary Examiner*—Thanh Cong Le
*Assistant Examiner*—Tan Trinh
(74) *Attorney, Agent, or Firm*—Mayer Fortkort & Williams, PC; Karen L. Williams, Esq.

(57) ABSTRACT

A method and system for controlling an accessory function by a cellular telephone are disclosed. In accordance with the method, the cellular telephone generates a message payload comprising a command to set a selected register on an accessory device to a selected value. The cellular telephone transmits the message payload to the accessory device. The selected value is stored in the selected register on the accessory device in response to the message payload. The accessory device periodically reads the contents of the selected register. The accessory device controls the accessory function in response to the contents read from the selected register. The simple message protocol uses memory and bandwidth resources efficiently, and allows additional accessory functions to be readily controlled without significant modifications to the protocol.

18 Claims, 3 Drawing Sheets

METHOD AND SYSTEM FOR CONTROLLING CELLULAR TELEPHONE ACCESSORY FUNCTIONS

This application claims priority of the provisional application No. 60/118,186 entitled "Simple Command Protocol (SCP) for Handset Accessory Devices" filed Feb. 1, 1999.

TECHNICAL FIELD OF THE INVENTION

The present invention relates to cellular telephones, and in particular to a method and system for controlling cellular telephone accessory functions.

BACKGROUND OF THE INVENTION

Cellular telephones are becoming increasingly "intelligent," with a greater degree of functionality and a more sophisticated user interface. One aspect of this increase in functionality is the ability to control the operation of accessories, such as a vehicle-mounted hands free kit, through the microprocessor in the telephone handset.

Accessories can be classified into two main groups: "intelligent" accessories and "non-intelligent" accessories. An "intelligent" accessory is one with a microprocessor inside, which is capable of controlling operations of the accessory. A "non-intelligent" accessory lacks a microprocessor and/or the attendant programmability, featuring instead direct hardware-based control of the accessory functions.

Communication between a cellular telephone handset and one or more accessories often occurs by means of a multi-pin connector. The method by which a cellular telephone controls accessory functions has typically depended on the type of accessory. For a non-intelligent accessory, the telephone handset typically controls accessory functions directly using hardware-based controls, which requires that at least one pin of the multi-pin connector be dedicated to the control of each function. Besides being inflexible, this method becomes impractical as the number of controllable accessory functions increases beyond the number of available pins.

For intelligent accessories, communication between the microprocessor in the telephone handset and the microprocessor in the accessory is possible. While this is more flexible than the hard-wired method described above, such CPU-to-CPU communications have typically been executed using a complex language which has a "vocabulary" of one or more commands for each function to be controlled. Such a language is unwieldy and memory-intensive.

SUMMARY OF THE INVENTION

Thus, a need has arisen for a method and system for controlling cellular telephone accessory functions that addresses the disadvantages and deficiencies of the prior art. Accordingly, a novel method and system for controlling cellular telephone accessory functions is disclosed.

In the method for controlling an accessory function by a cellular telephone, the cellular telephone generates a message payload comprising a command to set a selected register on an accessory device to a selected value. The cellular telephone transmits the message payload to the accessory device. The selected value is stored in the selected register on the accessory device in response to the message payload. The accessory device periodically reads the contents of the selected register. The accessory device controls the accessory function in response to the contents read from the selected register.

In accordance with another aspect of the present invention, a cellular telephone system is disclosed. The system includes an accessory that has a processor with an internal memory. The internal memory has registers controlling respective functions of the accessory. The system also includes a cellular telephone with a processor that generates commands for writing data to the registers of the accessory processor, and transmits the commands to the accessory. The accessory processor receives and follows the commands from the cellular telephone, and reads data from the registers, and updates respective functions of the accessory in response to the data read from the registers. In one embodiment, the accessory processor is capable of writing data to the registers in response to user input received by the accessory.

An advantage of the present invention is that the simple message protocol uses memory and bandwidth resources efficiently. Another advantage of the present invention is that the flexibility of the protocol allows additional accessory functions to be readily controlled without significant modifications to the protocol.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENT

The preferred embodiments of the present invention and their advantages are best understood by referring to FIGS. 1 through 4C of the drawings. Like numerals are used for like and corresponding parts of the various drawings.

Figure 1:
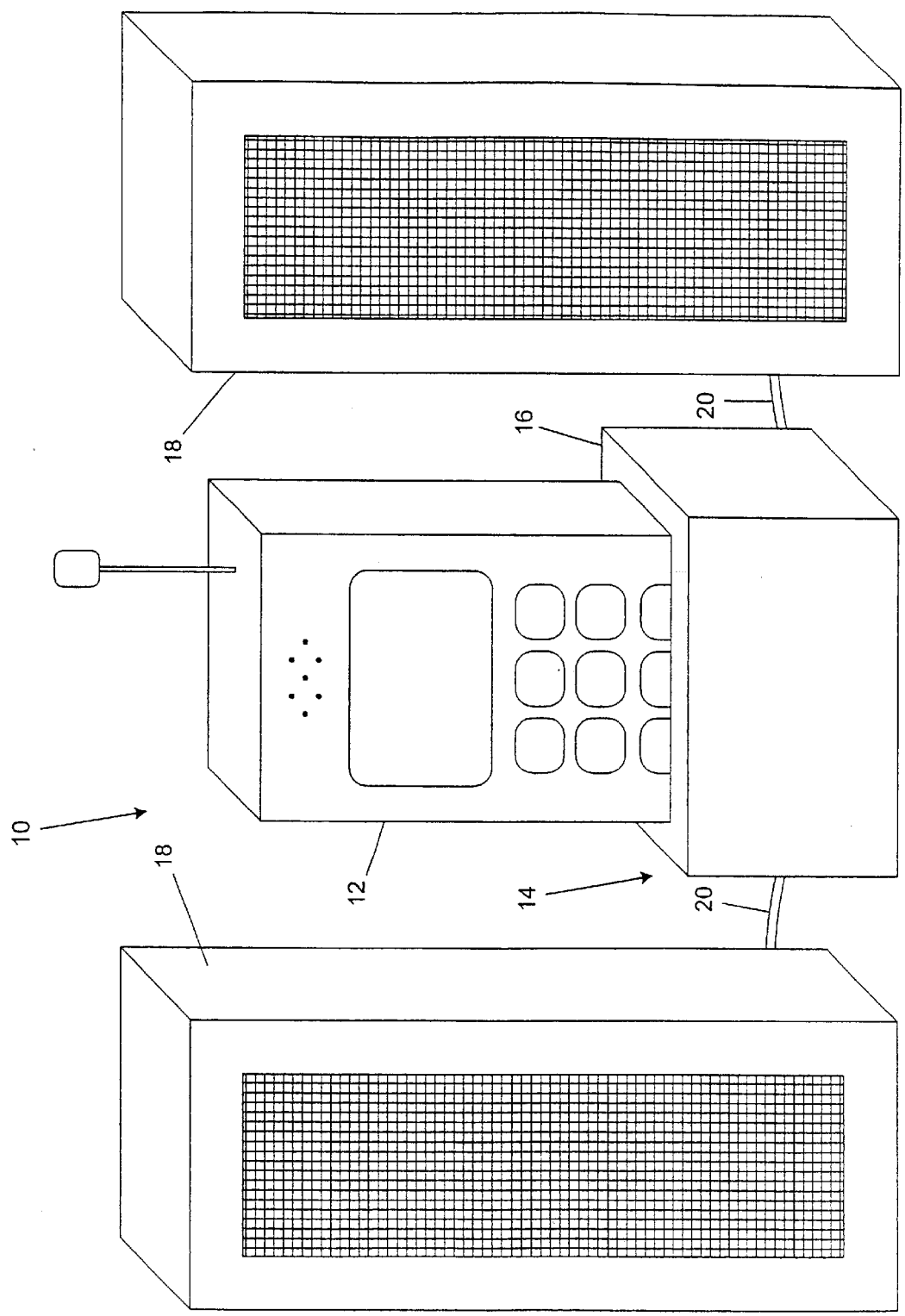
FIG. 1 is an illustration of a cellular telephone system designed to operate in accordance with the present invention.

Referring to FIG. 1, a cellular telephone system 10 is shown. Cellular telephone system 10 includes a cellular telephone handset 12 and hands free kit 14. Ordinarily, hands free kit 14 would be mounted on, for example, a vehicle console or dashboard. In this example, hands free kit 14 includes a telephone mount 16 and speakers 18 connected to telephone mount 16 by speaker wires 20. Hands free kit 14 may alternatively be connected to speakers 18 through a vehicle stereo system (not shown), and may also be connected to other vehicle functions such as an ignition detection system (not shown) to determine whether the vehicle ignition is on. Hands free kit 14 is shown merely as an example of a cellular telephone accessory capable of communicating with handset 12. Thus, as will become apparent, other accessories may alternatively be used in conjunction with handset 12, such as a wired or wireless headset, a desktop speakerphone or a different hands free kit configuration.

Figure 2:
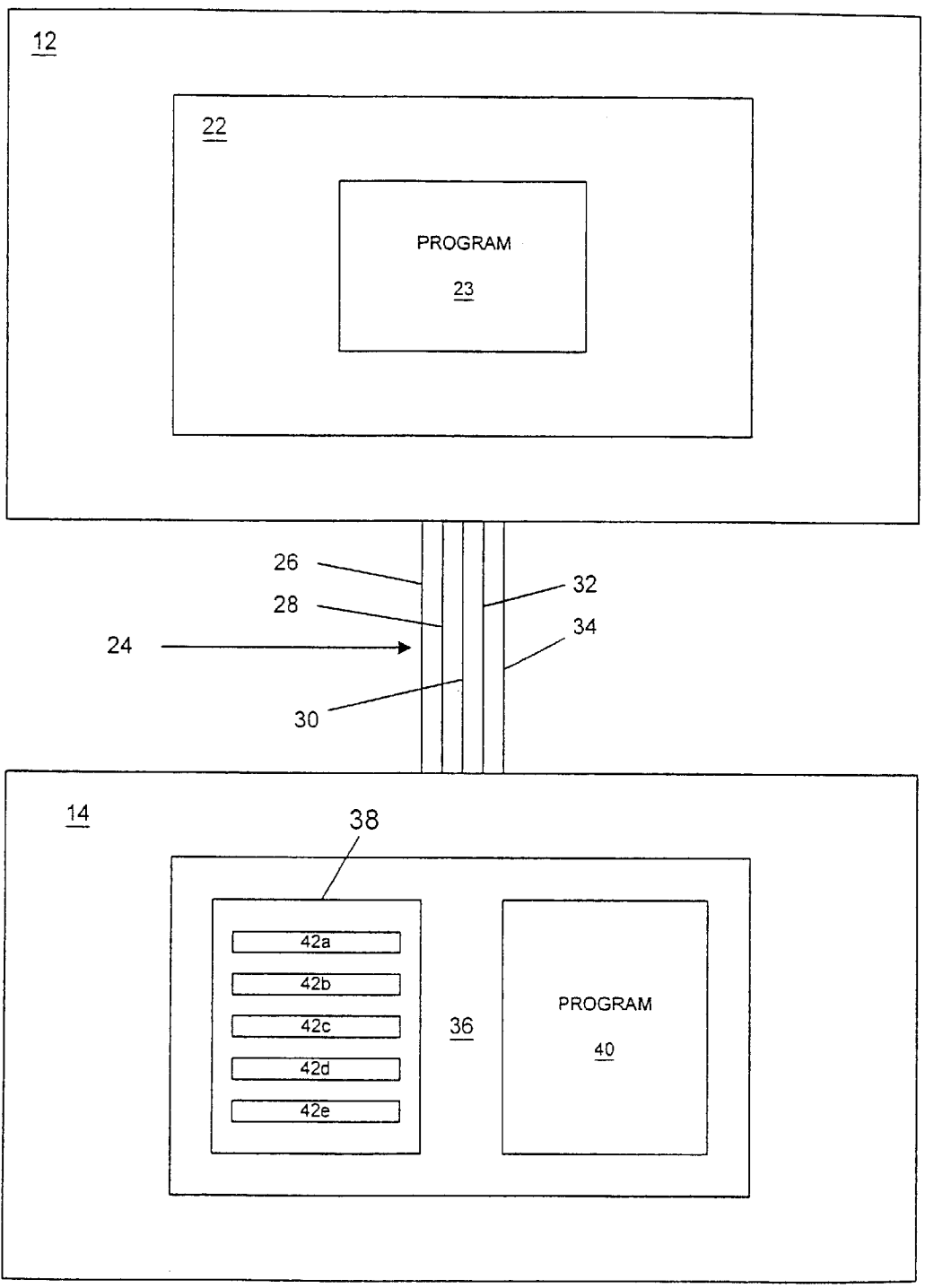
FIG. 2 is a block diagram of the cellular telephone system.

Referring to FIG. 2, a block diagram of cellular telephone system 10 is shown. In handset 12, a central processing unit (CPU) 22 communicates via a communication link 24 with hands free kit 14. Communication link 24 may include, for example, a multibit parallel bus connected by a multi-pin connector of conventional design. In this example, communication link 24 includes a data in line 26, a data out line 28, a clock line 30, an audio in line 32 and an audio out line 34. Audio in line 32 and audio out line 34 are used to carry analog audio (voice) signals between handset 12 and hands free kit 12. The other lines of communication link 24 are used to carry data, as will be described below. Communication link 24 may also include other lines such as, for example, reference voltage, power supply and ground lines (not shown). To control the reception and transmission of information over communication link 24, CPU 22 executes a software program 23, which will be described more fully below.

Hands free kit 14 includes a CPU 36 with an internal memory 38. CPU 36 communicates with CPU 22 of handset 12 via communication link 24. CPU 36 executes a software program 40 which controls the reception and transmission of information over communication link 24. Program 40 also controls the operation of hardware components such as speakers 18, and maintains within internal memory 38 a set of virtual registers 42a through 42e for this purpose. The function of virtual registers 42a through 42e will be described more fully below.

In accordance with one aspect of the present invention, handset 12 communicates with hands free kit 14 over lines 26, 28 and 30 using a simple command protocol. This simple command protocol primarily involves writing data to and reading data from virtual registers 42a through 42e.

Figure 3A:
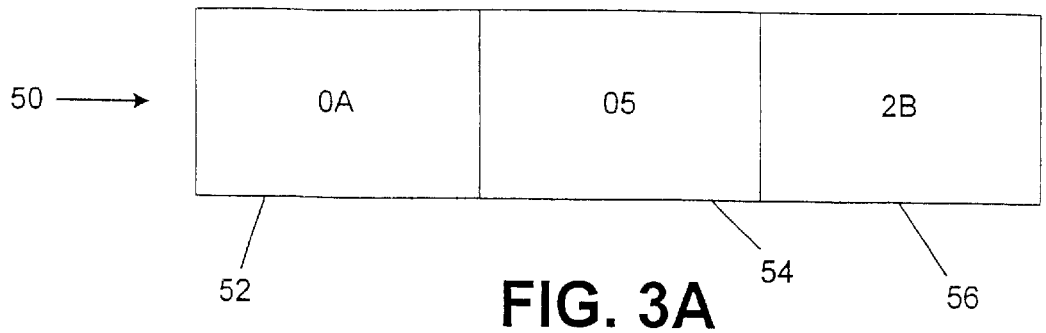
FIGS. 3A and 4A are diagrams illustrating message payloads using the simple command protocol described herein.

Referring to FIG. 3A, a diagram illustrating the payload 50 of a message using the simple command protocol is shown. Payload 50 includes a "message type" byte 52, an "index" byte 54 and a "data" byte 56. Each of these three bytes has eight bits. Exemplary contents for these three bytes are shown in FIG. 3A using hexadecimal notation. The meaning and usage of each of these three bytes will be described below.

Figure 3B:
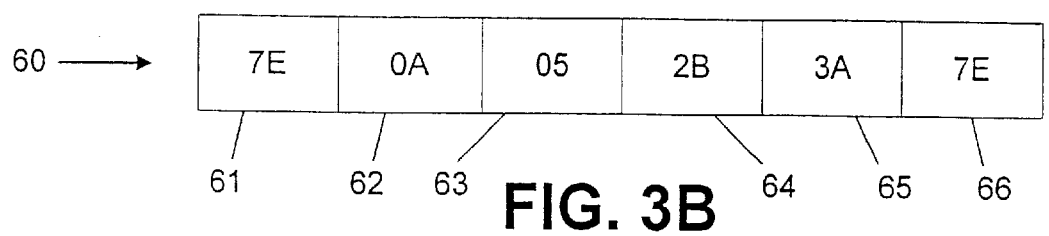
FIGS. 3B and 4B are diagrams of messages used to communicate the respective payloads of FIGS. 3A and 4A.

Referring to FIG. 3B, a message 60 used to communicate payload 50 between handset 12 and an accessory such as hands free kit 14 is illustrated. Message 60 includes seven bytes 61 through 66, each having eight bits. Once again, exemplary contents for these bytes are shown using hexadecimal notation.

In this example, message 60 is communicated serially from handset 12 to hands free kit 14 over data out line 28, clocked by a clock signal on clock line 30. Bytes 61 through 66 are therefore transmitted serially from left to right, with the most significant bit being transmitted first.

Message 60 begins at byte 61 with a start/end flag value 7E. Message 60 ends at byte 66 with the same start/end flag value. The hexadecimal value 7E is used merely to denote the beginning or end of a message. Consequently, this value may not be used elsewhere in message 60.

Following the initial start/end flag at byte 61, the three-byte payload 50 of message 60 is delivered. Thus, bytes 62, 63 and 64 carry the same values as bytes 52, 54 and 56, respectively. Byte 65 is a checksum byte representing the sum of bytes 62, 63 and 64 (0A+05+2B=3A). Byte 66, as previously described, has a start/end flag value 7E and denotes the end of message 60.

As previously mentioned, the hexadecimal value 7E is a "reserved" value that is given a special meaning as a start/end flag. The value 7E used for the start/end flag is somewhat arbitrary, and other values may alternatively be used. Another "reserved" value is the ESC character, which is arbitrarily chosen to be the hexadecimal value 7D. The ESC character is used to communicate payloads in which a "reserved" value appears, as illustrated below.

Figure 4A:
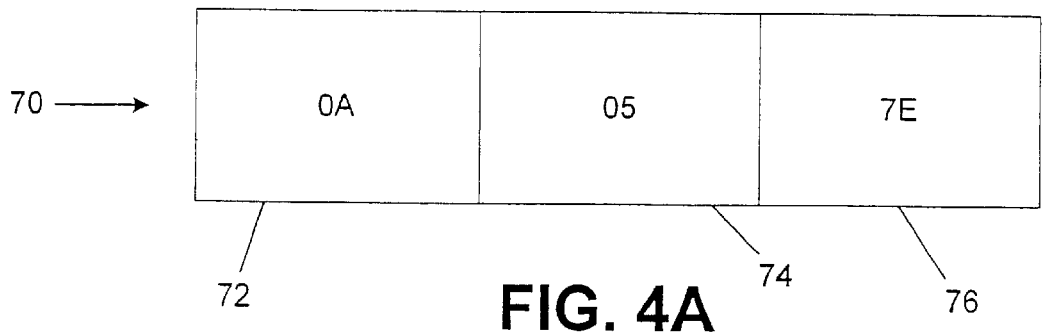

Referring to FIG. 4A, a diagram illustrating the payload 70 of another message is shown. Payload 70 includes a message type byte 72, an index byte 74 and a data byte 76 as previously described. However, in this case the data byte 76 has a "reserved" value 7E, which is normally used in a message as a start/end flag. Thus, payload 70 requires special treatment when being encoded in a message.

Figure 4B:
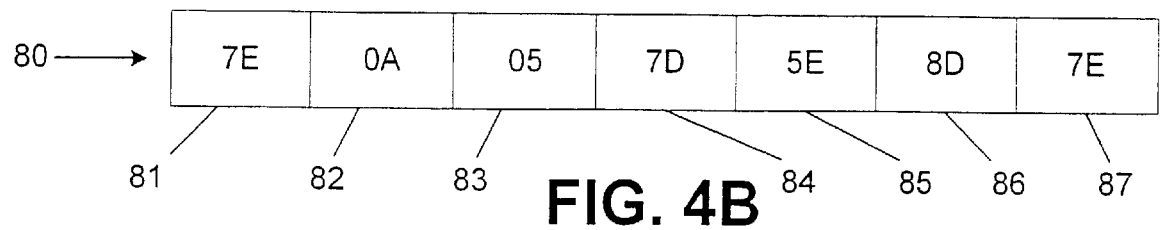

Referring to FIG. 4B, a message 80 for communicating payload 70 is shown. Message 80 begins with a start/end flag byte 81 and ends with a checksum byte 86 and a start/end flag byte 87 as previously described with respect to FIG. 3B. However, in this example, four bytes 82 through 85 are used to communicate the three-byte payload 70.

Bytes 82 and 83 are identical in content to bytes 72 and 74, respectively, of payload 70. These payload bytes are placed directly into message 80 because they do not contain any "reserved" values.

Byte 76 has a "reserved" value 7E. Byte 76 is therefore represented by two bytes 84 and 85 in message 80. Byte 84 is the ESC character 7D, which is used as a flag to indicate that the following byte is an encoded "reserved" value. Byte 85 is encoded by combining the "reserved" character in question, in this case 7E, with an "ESC complement value," in this case the hexadecimal value 20, in a bit-by-bit exclusive-OR operation. The result is 7E XOR 20=5E, and this is the value of byte 85. The ESC complement value is chosen arbitrarily, and may be any value so long as both handset 12 and hands free kit 14 "know" what the value is.

The checksum byte 86 is derived by summing the original (decoded) payload bytes and ignoring the start/end flag bytes 81 and 87 and the ESC character byte 84. The result (0A +05+7E=8D) is the value of the checksum byte 86.

When message 80 is received by, for example, hands free kit 14, the payload 70 of message 80 may be derived by reversing the above-described encoding process. Thus, start/end flag bytes 81 and 87 are ignored. Bytes 82 and 83 are taken directly from message 80. Byte 84 which contains the ESC character 7D is ignored, but the following byte 85 is XOR'ed with the ESC complement value (20) to derive payload byte 76. A checksum operation is then performed and the result is compared to checksum byte 86 to determine whether all data was correctly received.

The meaning of payloads 50 and 70 will now be described by reference to Table A, which describes three commands and their corresponding payload bytes. These three commands (Set Register, Get Register and Synchronization Acquire) form a command vocabulary that is sufficient to allow handset 12 to control any desired functions of an accessory such as hands free kit 14. In Table A, the entry "xx" denotes a hexadecimal value to be chosen by the sender of the message.

TABLE A

| Command | Message Type | Index | Data |
|---|---|---|---|
| Set Register | 0A | xx | xx |
| Get Register | C1 | xx | not used (00) |
| Synchronization Acquire | A4 | not used (00) | xx |

Each command has a corresponding message type byte value. These three byte values (in this example 0A, C1 and A4) are, for the sake of simplicity, preferably different from the start/end flag value (e.g., 7E) and the ESC value (e.g., 7D). However, unlike the start/end flag value and the ESC value, the three message type values need not be "reserved," meaning that these three message type values may also appear elsewhere in the message, such as in the index byte, the data byte or the checksum byte, without using the encoding method previously described. This is because the message type byte 82 occurs at a fixed position relative to the first start/end flag byte 81. Thus, the meaning of, for example, a hexadecimal value 0A is readily determined by its position relative to the first start/end flag byte 81.

For both the Set Register and Get Register commands, the index byte 54, 74 is used to indicate which one of the virtual registers 42a through 42e in the internal memory 42 of hands free kit 14 is being addressed. For example, the index byte value 05 may be used to designate the fifth virtual register, e.g., register 42e. Alternatively, a preselected offset value may be added to the index byte of each message so as to achieve desired bitstream characteristics for the message. This offset value is then subtracted from the index byte value when the message is received.

For the Set Register command, the data byte 56, 76 is the value to which the selected register is to be set. Thus, using payload 50 as an example, register #05 (e.g., register 42e) is to be set to the hex value 2B, or binary 00101011. For the Get Register command, the data byte is not used in the command message, and is therefore set to 00.

The Synchronization Acquire command may be sent when handset 12 detects an accessory that has been powered up and connected to handset 12. The purpose of this message is to determine whether the accessory connected to handset 12 is an intelligent one. If an appropriate response to the Synchronization Acquire command is received, such as an acknowledge message from the accessory (described below), then the accessory is determined to be intelligent. Handset 12 then commences communication with the accessory using the Set Register and Get Register commands. If the accessory is not intelligent, then a hardware-based control method different from the simple message protocol described herein is implemented by handset 12.

The manner in which an accessory such as hands free kit 14 responds to the command messages described above will now be described. Hands free kit 14 responds to each message by executing the desired request and/or sending an acknowledge message. The order in which these two tasks are performed depends on the command.

In response to a Set Register command, CPU 36 of hands free kit 14 first sends an acknowledge message, and then sets the register in question to the desired value. The acknowledge message is derived from the payload of the command message. After the payload of the command message has been extracted and the message type byte examined to determine that a Set Register command is being sent, CPU 36 (under the direction of software program 40) inverts the three payload bytes of the command message. These inverted payload bytes are then treated as payload for an acknowledge message.

Figure 4C:
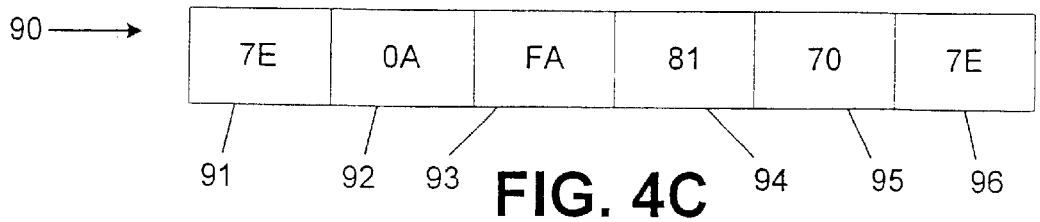
FIG. 4C is a diagram of an acknowledge message in accordance with the simple message protocol.

Referring to FIG. 4C, an acknowledge message 90 responsive to command message 80 is illustrated. When command message 80 is received by CPU 36, the original three payload bytes 72, 74 and 76 are extracted. The message type byte 72 is left unchanged and forms byte 92 of acknowledge message 90. The index and data bytes 74 and 76 are inverted to form bytes 93 and 94, respectively, of acknowledge message 90. A checksum byte 95 is then generated by CPU 36 based on bytes 92 through 94 (0A+ FA+81=85). Start/end flag bytes 91 and 96 are then added to the ends of the message to create a completed acknowledge message 90.

Acknowledge message 90 is transmitted to cellular telephone 12 on data in line 26 from left to right, clocked by a clock signal on clock line 30. CPU 22 (under the direction of software program 23) checks both the checksum byte 95 and the payload bytes 92 through 94 to ensure that the command message 80 was properly received.

In the event that a correct acknowledge message is not received by CPU 22 within a specified timeout period (e.g. 10 ms), the command message may be resent by CPU 22. A repeat counter may be used to limit the number of times a message is resent.

In response to a Get Register command, software program 40 first reads the contents of the virtual register in question (e.g., register 42e). An acknowledge message is then created using the register contents. This acknowledge message is generated in a manner identical to that described above with respect to message 90, with the following exception. The data byte 94 of the acknowledge message is set equal to the inverted register contents. For example, if register 42e stores a value of 6D, then the data byte 94 of the acknowledge message 90 is set equal to 92, the inversion of 6D. The index byte is also inverted, as previously described, while the message type byte is left unchanged. The checksum and start/end flag bytes are then generated as previously described, and the acknowledge message is transmitted to handset 12.

In response to a Synchronization Acquire command, software program 40 performs no action other than to generate and transmit an acknowledge message. This acknowledge message is generated exactly as previously described for the response to a Set Register command. In other words, the message type byte is left unchanged, the index and data bytes are inverted, and checksum and start/end flag bytes are added.

In this manner, handset 12 is able to control and read the contents of registers 42a through 42e. As previously stated, each register controls one or more programmable functions of hands free kit 14.

CPU 36, under the direction of program 40, gives meaning to the data stored in registers 42a through 42e by controlling various accessory functions using that data. Each register may be dedicated to storing data for the control of one or more programmable functions of hands free kit 14. An exemplary set of register designations, defining the functions controlled by each register, is set forth in Table B.

TABLE B

| Register name | Register index | Access | Default value | Bit(s) | Comments |
|---|---|---|---|---|---|
| Length | 0 | read only | 10 | | Length of all registers (e.g., eight bits) |
| Reserved1 | 1 | n/a | 0 | | Not used |
| Reserved2 | 2 | n/a | 0 | | Not used |
| HFK_State | 3 | read only | 0 | 7 | 0 = Idle: Accessory not yet in sync |
| | | | | | 1 = Ready: Accessory in command interpretation mode |
| | | | | 6-0 | 000000: Reserved |
| | | | | | 000001: Installed hands free kit |
| | | | | | 000010: Portable hands free kit |
| | | | | | 000011: Desktop speakerphone |
| | | | | | 000100: Wireless headset |
| | | | | | 000101: Wired headset |
| | | | | | 000110: Flash programmer |
| | | | | | Remaining combinations unassigned |
| Version_Sw | 4 | read only | 0 | 7-4 | Software Version Major |
| | | | | 3-0 | Software Version Minor |
| Version_Hw | 5 | read only | 0 | | Hardware version |
| HFK_Hw1 | 6 | read/write | 0 | 7 | 1 = Mute stereo |
| | | | | | 0 = Unmute stereo |
| | | | | 6 | 1 = Mute privacy handset |
| | | | | | 0 = Unmute |
| | | | | 5 | 1 = Audio enable on |
| | | | | | 0 = Audio enable off |
| | | | | 4 | 1 = Full duplex |
| | | | | | 0 = Half duplex |
| | | | | 3 | 1 = Echo canceler on |
| | | | | | 0 = Echo canceler off |
| | | | | 2 | 1 = Noise suppressor on |
| | | | | | 0 = Noise suppressor off |
| | | | | 1-0 | 00 = Handset in idle mode |
| | | | | | 01 = Call termination request |
| | | | | | 10 = Handset missed call |
| HFK_Hw2 | 7 | read only | 0 | 7 | 1 = Ignition on |
| | | | | | 0 = Ignition off |
| | | | | 6 | 1 = Privacy handset |
| | | | | | 0 = Hands-free |
| | | | | 5-0 | Reserved |
| Volume_Level | 8 | read/write | 1 | | Volume levels 1–7 |
| | | | | | (Each increment is 3 dB) |
| Uart_Data | 9 | read only | 94 | 7-6 | Baud rate |
| | | | | | 00 = 4800 bps |
| | | | | | 01 = 9600 bps |
| | | | | | 10 = 19,200 bps |
| | | | | | 11 = 38,400 bps |
| | | | | 5-4 | Parity |
| | | | | | 00 = None |
| | | | | | 01 = Even |
| | | | | | 10 = Odd |
| | | | | 3 | Data size |
| | | | | | 0 = 8 bits |
| | | | | | 1 = 7 bits |
| | | | | 2 | Stop bit |
| | | | | | 0 = 1-bit |
| | | | | | 1 = 2-bit |
| | | | | 1-0 | Reserved |
| Reset_HFK | 10 | read/write | 0 | 7 | 1 = Reset hands free kit |
| | | | | | 0 = Don't reset |
| | | | | 6-0 | Reserved |

CPU 36 periodically checks each register 42*a* through 42*e* to determine the settings that are to be applied to the various functions of hands free kit 14, such as those set forth in Table B. The frequency with which each register is checked and the corresponding hardware function(s) updated may vary according to the need to rapidly update the various functional settings.

Of course, CPU 36 of hands free kit 14 may also be capable of setting the contents of registers 42*a* through 42*e* in response to input received directly from the user by hands free kit 14. Hands free kit 14, or any other accessory, may include a user interface (not shown) such as volume control buttons for that purpose.

It will be appreciated that the above-described method and system for controlling cellular telephone accessory functions provide a simple message protocol in which a small number of simple messages may be used to control a wide variety of accessory functions. The simplicity of the protocol results in efficient use of both memory and communication bandwidth, as well as providing means by which the number of functions controlled may be easily expanded.

Although the present invention and its advantages have been described in detail, it should be understood that various changes, substitutions, and alterations can be made therein without departing from the spirit and scope of the invention as defined by the appended claims.

What is claimed is:

1. A cellular telephone system comprising
an accessory having a processor with an internal memory, the internal memory having a plurality of registers controlling respective functions of the accessory, and
a cellular telephone having a processor operable to generate a message payload, including a command to set a selected register of the accessory processor to a selected value, and operable to transmit the message payload to the accessory;
wherein the accessory processor is operable to receive the message payload from the cellular telephone, and operable to store the selected value in the selected register in response to the message payload received from the cellular telephone, and operable to periodically read contents from the selected register and operable to update respective functions of the accessory in response to the contents read from the selected register.

2. The cellular telephone system of claim 1, further comprising a communication link operable to carry the commands from the cellular telephone to the accessory.

3. The cellular telephone system of claim 2, wherein the communication link comprises a multi-pin connector.

4. The cellular telephone system of claim 2, wherein the communication link comprises a data in line for carrying data from the accessory to the cellular telephone, a data out line for carrying data from the cellular telephone to the accessory, and a clock line for carrying clock signals between the cellular telephone and the accessory.

5. The cellular telephone system of claim 4, wherein the communication link further comprises an audio in line for carrying audio signals from the accessory to the cellular telephone, and an audio out line for carrying audio signals from the cellular telephone to the accessory.

6. The cellular telephone system of claim 1, wherein the accessory comprises a hands free kit.

7. The cellular telephone system of claim 1, wherein the accessory processor is operable to write data to the registers in response to user input received by the accessory.

8. A method for controlling an accessory function by a cellular telephone, comprising:
generating a message payload by the cellular telephone, the message payload comprising a command to set a selected register on an accessory device to a selected value;
transmitting the message payload by the cellular telephone to the accessory device;
storing the selected value in the selected register on the accessory device in response to the message payload;
periodically reading contents from the selected register by the accessory device; and
controlling the accessory function by the accessory device in response to the contents read from the selected register.

9. The method of claim 8, wherein generating the message payload by the cellular telephone comprises:
generating a message type byte identifying the message payload as a command to set a selected register on an accessory device to a selected value;
generating an index byte identifying the selected register; and
generating a data byte identifying the selected value.

10. The method of claim 8, wherein transmitting the message payload by the cellular telephone to the accessory device comprises:
generating a checksum value from the message payload;
generating a message comprising a start flag, the message payload, the checksum value and an end flag; and
transmitting the message from the cellular telephone to the accessory device.

11. The method of claim 10, wherein transmitting the message from the cellular telephone to the accessory device comprises transmitting the message on a data out line simultaneously with a clock signal provided on a clock line.

12. The method of claim 10, wherein generating the message further comprises:
generating a message type byte identifying the message payload as a command to set a selected register on an accessory device to a selected value;
generating an index byte identifying the selected register;
generating a data byte identifying the selected value;
comparing the data byte to a set of one or more reserved values to determine whether the data byte matches one of the set of reserved values;
generating a flag byte in response to a determination that the data byte matches one of the set of reserved values; and
altering the data byte in response to a determination that the data byte matches one of the set of reserved values.

13. The method of claim 12, wherein altering the data byte comprises performing an exclusive-OR operation with the data byte and a selected byte value.

14. The method of claim 12, wherein generating the message further comprises:
comparing the index byte to a set of one or more reserved values to determine whether the index byte matches one of the set of reserved values;
generating a flag byte in response to a determination that the index byte matches one of the set of reserved values; and
altering the index byte in response to a determination that the index byte matches one of the set of reserved values.

15. The method of claim 8, further comprising transmitting an acknowledge message by the accessory device in response to the message payload.

16. The method of claim 15, further comprising:
inspecting the acknowledge message by the cellular telephone to determine whether the message payload was correctly transmitted and acknowledged; and
retransmitting the message payload by the cellular telephone to the accessory device in response to a determination that the was not correctly transmitted or acknowledged.

17. A wireless divice systim comprising:
an accessory having a processor with an internal memory, the internal memory having a plurality of registers conrtolling respective functions of the accessory; and
a wireless device having a processor operable to generate a message payload, including a command to set a selected register of the accessory processor to a selcted value, and operable to transmit the message payload to the accessory,
wherein the accesory processor is operable to receive the messeage payload from the wireless device, and operable to store the selected value in the selected register in response to the message payload recived from the wireless device, adn operable to perioically read contents from the selected register and operable to updeat respective functions of the accessory in response to content read from the selected register.

18. The wireless device system of claim 17, wherein the wireless device is a personal digital assistant (PAD).

* * * * *

UNITED STATES PATENT AND TRADEMARK OFFICE
CERTIFICATE OF CORRECTION

PATENT NO. : 6,603,986 B1
DATED : August 5, 2003
INVENTOR(S) : Theodore S. Bozoukov It is certified that error appears in the above-identified patent and that said Letters Patent is hereby corrected as shown below:

Column 6,
Line 62, after "registers", change "42 a to 42e" to -- 42a to 42e --.

Column 10,
Line 46, before "was" insert -- message payload --.
Line 47, after "wireless", change "divice systim" to -- device system --.
Line 50, before "respective", change "conrtolling" to -- controlling --.
Line 57, before "payload", change "messeage" to -- message --.
Line 59, after "payload", change "recived" to -- received --.
Line 60, after "device," change "adn" to -- and --.
Line 60, after "to", change "perioically" to -- periodically --.
Line 61, after "to" change "updeat" to -- update --.
Line 63, before "content", insert -- the --.
Line 63, change "content" to -- contents --.
Line 65, change "(PAD)", to -- (PDA) --.

Signed and Sealed this

Twenty-third Day of March, 2004

JON W. DUDAS
*Acting Director of the United States Patent and Trademark Office*